(12) United States Patent
Liu

(10) Patent No.: US 11,082,868 B2
(45) Date of Patent: Aug. 3, 2021

(54) SERVICE ACCESS METHOD AND DEVICE TO DETERMINE THE AVAILABILITY OF A SERVICE PATH FOR SERVICE ACCESS

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 62 days.

(21) Appl. No.: 16/708,638

(22) Filed: Dec. 10, 2019

(65) Prior Publication Data
US 2020/0112866 A1 Apr. 9, 2020

Related U.S. Application Data

(63) Continuation of application No. PCT/CN2017/096267, filed on Aug. 7, 2017.

(51) Int. Cl.
*H04W 24/08* (2009.01)
*H04W 76/12* (2018.01)
(Continued)

(52) U.S. Cl.
CPC ............ *H04W 24/08* (2013.01); *H04L 47/24* (2013.01); *H04L 47/26* (2013.01); *H04W 24/10* (2013.01);
(Continued)

(58) Field of Classification Search
CPC ..... H04W 24/08; H04W 76/12; H04W 24/10; H04W 28/10; H04W 48/16; H04W 48/18; H04W 24/02; H04W 24/06; H04W 41/06; H04W 76/00; H04L 47/24; H04L 47/26; H04L 47/00; H04B 41/06
See application file for complete search history.

(56) References Cited

U.S. PATENT DOCUMENTS 8,395,987 B2 * 3/2013 Jacobson ............. H04W 48/08
370/216
2010/0233960 A1 * 9/2010 Tucker ............... H04L 61/1511
455/41.2
(Continued)

FOREIGN PATENT DOCUMENTS

CN 1568046 A 1/2005
CN 101741513 A 6/2010
(Continued)

OTHER PUBLICATIONS

The first Office Action of corresponding Russian application No. 2019143169, dated Sep. 3, 2020.
(Continued)

*Primary Examiner* — Mewale A Ambaye

(57) ABSTRACT

Embodiments of the present application provide a service access method and device, which is beneficial to implementing effective access of services, the method including: A first device determines the receiving condition of a first data packet transmitted through a first service path; and the first device determines, according to the receiving condition of the first data packet, whether the first service path is available.

17 Claims, 2 Drawing Sheets

A first device determines a receiving condition of a first data packet transmitted through a first service path — S210

The first device determines whether the first service path is available according to the receiving condition of the first data packet — S220

(51) Int. Cl.
- *H04L 12/851* (2013.01)
- *H04L 12/825* (2013.01)
- *H04W 24/10* (2009.01)
- *H04W 28/10* (2009.01)
- *H04W 48/16* (2009.01)
- *H04W 48/18* (2009.01)

(52) U.S. Cl.
CPC ........... *H04W 28/10* (2013.01); *H04W 48/16* (2013.01); *H04W 48/18* (2013.01); *H04W 76/12* (2018.02)

(56) References Cited

U.S. PATENT DOCUMENTS

| | | | |
|---|---|---|---|
| 2013/0176935 A1* | 7/2013 | Kim | H04B 7/14 370/315 |
| 2014/0269531 A1* | 9/2014 | Luna | H04M 1/72454 370/329 |
| 2015/0079985 A1* | 3/2015 | Vuchula | H04W 48/16 455/435.1 |
| 2015/0348221 A1 | 12/2015 | Pedersen et al. | |
| 2016/0301769 A1* | 10/2016 | Trost | H04L 67/1097 |

FOREIGN PATENT DOCUMENTS

| | | |
|---|---|---|
| CN | 101784072 A | 7/2010 |
| CN | 102651883 A | 8/2012 |
| CN | 103561472 A | 2/2014 |
| RU | 2515701 C2 | 5/2014 |
| WO | 2017063485 A1 | 4/2017 |

OTHER PUBLICATIONS

The EESR of corresponding European application No. 17920778.2, dated Apr. 28, 2020.
International Search Report (ISR) dated Apr. 25, 2018 for Application No. PCT/CN2017/096267.
3GPP TS 23.161 V14.0.0 (Mar. 2017); 3rd Generation Partnership Project; Technical Specification Group Services and System Aspects; Network-Based IP Flow Mobility (NBIFOM);Stage 2(Release 14).
3GPP TS 36.300 V13.2.0 (Dec. 2015); 3rd Generation Partnership Project; Technical Specification Group Radio Access Network;Evolved Universal Terrestrial Radio Access (E-UTRA) and Evolved Universal Terrestrial Radio Access Network (E-UTRAN);Overall description;Stage 2(Release 13).
The first Office Action of corresponding Canadian application No. 3065625, dated Feb. 25, 2021.
The first Office Action of corresponding Indian application No. 201917049954, dated Mar. 10, 2021.

* cited by examiner

SERVICE ACCESS METHOD AND DEVICE TO DETERMINE THE AVAILABILITY OF A SERVICE PATH FOR SERVICE ACCESS

CROSS-REFERENCE TO RELATED APPLICATIONS

This application is a continuation application of the International application PCT/CN2017/096267, filed on Aug. 7, 2017, entitled "SERVICE ACCESS METHOD AND DEVICE", the content of which is hereby incorporated by reference in its entirety.

TECHNICAL FIELD

The present application relates to the field of communications, and in particular, to a service access method and device.

BACKGROUND

In a 5G system, a terminal device may access a service through a 3rd Generation Partnership Project (3GPP) network or a non-3GPP network. Specifically, the network side has a service access management node, which may be responsible for managing the service accessed through the 3GPP network or the non-3GPP network.

Therefore, for the terminal device or the service access management node, it is an urgent problem to be solved with regard to how to implement effective access of services.

SUMMARY

Embodiments of the present application provide a service access method and device, which is beneficial to realizing effective access of services.

In a first aspect, a service access method is provided, including:

determining, by a first device, a receiving condition of a first data packet transmitted through a first service path; and determining, by the first device, whether the first service path is available according to the receiving condition of the first data packet.

Therefore, in the service access method according to the embodiments of the present application, the first device may determine whether the first service path for service access is available before the service access, thus facilitating the selection of an available service path to access, and further implementing effective access of services by the terminal.

In an embodiment, in a case where the first service path is available, the first service path may be used for service access, and in a case where the first service path is unavailable, a further service path is selected for access, or the first service path with a reduced load may be used to access, thereby realizing the effective access of services by the terminal, and further improving user experience.

In conjunction with the first aspect, in some implementations of the first aspect, the first device is a sending end of the first data packet, and the second device is a receiving end of the first data packet; or the first device is the receiving end of the first data packet, and the second device is the sending end of the first data packet.

In conjunction with the first aspect, in some implementations of the first aspect, the first device is a terminal device, and the second device is a network device, or the first device is a network device, and the second device is a terminal device.

In conjunction with the first aspect, in some implementations of the first aspect, the network device is a service function management node or a user plane function (UPF) entity.

In conjunction with the first aspect, in some implementations of the first aspect, the method further includes:

sending, by the first device, the first data packet to the second device according to a specific period, or receiving the first data packet sent by the second device according to the specific period.

In conjunction with the first aspect, in some implementations of the first aspect, the sending, by the first device, the first data packet to the second device according to a specific period includes:

sending, by the first device, the first data packet to the second device according to the specific period in a case where a first preset condition is satisfied.

In conjunction with the first aspect, in some implementations of the first aspect, the specific period is agreed by the first device and the second device; or, if the first device is a terminal device, and the second device is a network device, then the specific period is configured by the second device.

That is, the first device and the second device may determine, through message interaction, a sending period of the first device, that is, the above-mentioned specific period, or, if the first device is a terminal device, and the second device is a network device, then the specific period is configured by the second device, that is, the second device may configure, for the first device, the sending period of the first data packet, for example, the second device may send a first message to the first device, and configure, by using the first message, the sending period of the first data packet for the first device, the first message may be scan-static signaling (for example, a radio resource control (RRC) message) or dynamic signaling (for example, downlink control information (DCI).

Alternatively, the specific period may also be agreed through a protocol, in this way, the information interaction between the first device and the second device is not necessary, and the sending end may send the first data packet according to the sending period agreed through the protocol, and the receiving end may also receive the first data packet according to the sending period agreed through the protocol.

In conjunction with the first aspect, in some implementations of the first aspect, a data stream or bearer used for transmitting the first data packet has a corresponding relationship with a sending period of the first data packet.

For example, there may be a one-to-one correspondence or a many-to-one correspondence or the like between the data stream used for transmitting the first data packet and the sending period of the first data packet, similarly, there may also be a one-to-one correspondence or a many-to-one correspondence or the like between the bearer used for transmitting the first data packet and the sending period of the first data packet.

In conjunction with the first aspect, in some implementations of the first aspect, the first device is the sending end of the first data packet, and the determining, by a first device, a receiving condition of a first data packet transmitted through a first service path includes:

receiving, by the first device, the receiving condition of the first data packet reported by the second device;

the determining, by the first device, whether the first service path is available according to the receiving condition of the first data packet includes:

determining, by the first device, whether the first service path is available according to the receiving condition of the first data packet reported by the second device.

In conjunction with the first aspect, in some implementations of the first aspect, the determining, by the first device, whether the first service path is available according to the receiving condition of the first data packet includes:

determining, by the first device, that the first service path is unavailable when at least one of following conditions is satisfied:

the first data packet is not correctly received within a specific time in a receiving period, a number of data packets correctly received in a receiving window is lower than a first preset value, and a ratio of the data packets received correctly to all received packets in the receiving window is lower than a second preset value, and a ratio of data packets received incorrectly to all received packets in the receiving window is higher than a third preset value, and a ratio of the data packets received incorrectly to the data packets received correctly in the receiving window is higher than a fourth preset value and a ratio of the data packet received correctly to the data packets received incorrectly in the receiving window is lower than a fifth preset value.

In an embodiment, the first preset value, the second preset value, the third preset value, the fourth preset value, and the fifth preset value may be set by a system, or determined according to a service need of a to-be-accessed service. For example, if the to-be-accessed service has a higher requirement on a link quality, then the first preset value may be set to a relatively large value, and the second preset value may be set to a relatively small value, and the third preset value may be set to a relatively small value, and the fourth preset value may be set to a relatively small value, and the fifth preset value may be set to a relatively large value, otherwise, if the to-be-accessed service has a lower requirement on the link quality, then the first preset value may be set to a relatively small value, and the second preset value may be set to a relatively large value, and the third preset value may be set to a relatively large value, and the fourth preset value may be set to a relatively large value, and the fifth preset value may be set to a relatively small value.

In conjunction with the first aspect, in some implementations of the first aspect, the first device is a terminal device or a UPF entity, and after the determining, by the first device, that the first service path is unavailable, the method further includes:

sending, by the first device, status information to a service function management node, where the status information is used to indicate that the first service path is unavailable, enabling the service function management node to switch a to-be-accessed service to a further service path other than the first service path, or initiate a request message for releasing the first service path.

Therefore, in the service access method according to the embodiments of the present application, in a case where the first service path is unavailable, the first device may notify the service function management node of information about the unavailability of the first service path, thus enabling the service function management node to switch a to-be-accessed service of the terminal device to a further service path, or release the first service path, and then access the to-be-accessed service initiated by the terminal device through the first service path, thereby realizing effective access of services, and further improving the user experience.

In conjunction with the first aspect, in some implementations of the first aspect, the first device is a service function management node, and after the determining, by the first device, that the first service path is unavailable, the method further includes:

switching, by the first device, a to-be-accessed service to a further service path other than the first service path, or initiating a request message for releasing the first service path.

Therefore, in the service access method according to the embodiments of the present application, in a case where the first service path is unavailable, the first device may switch a to-be-accessed service of the terminal device to a further service path, or release the first service path and then access the to-be-accessed service initiated by the terminal device through the first service path, thereby realizing effective access of services, and further improving the user experience.

In conjunction with the first aspect, in some implementations of the first aspect, the method further includes:

accessing, by the first device, a to-be-accessed service through the first service path if the first device determines that the first service path is available.

In conjunction with the first aspect, in some implementations of the first aspect, the first data packet includes a sequence number, and the determining, by a first device, a receiving condition of a first data packet transmitted through a first service path includes:

determining, by the first device according to the sequence number of the received first data packet, the receiving condition of the first data packet.

In conjunction with the first aspect, in some implementations of the first aspect, the first service path is a 3rd Generation. Partnership Project (3GPP) path or a non-3GPP path.

For example, if the first service path is a 3GPP path, the to-be-accessed service may be accessed through a 3GPP network (for example, a long term evolution (LTE) network or a 5G network, etc.), or, if the first service path is a non-3GPP path, the to-be-accessed service may be accessed through a non-3GPP network, such as a wireless local area network (WLAN) network.

In general, in the service access method according to the embodiments of the present application, in a case where the first service path is available, the first service path may be used to access a to-be-accessed service initiated by a terminal device, and in a case where the first service path is unavailable, a further service path may be used to access the to-be-accessed service initiated by the terminal device, or a part or all of the services on the first service path may be stopped, and the to-be-accessed service initiated by the terminal device may be accessed using the first service path.

In a second aspect, a service access device is provided for performing the above-mentioned first aspect or the method in any possible implementations of the first aspect. In particular, the device includes a unit for performing the method in the above-mentioned first aspect or any possible implementations of the first aspect.

In a third aspect, a service access device is provided, the device includes: a memory, a processor, an input interface, and an output interface. Where the memory, the processor, the input interface, and the output interface are connected by a bus system. The memory is configured to store an instruction, and the processor is configured to execute the instruction stored in the memory for performing the method in the above-mentioned first aspect or any possible implementations of the first aspect.

In a fourth aspect, a computer storage medium is provided for storing a computer software instruction including programs designed for implementing the above aspects that is used for performing the method in the above-mentioned first aspect or any possible implementation of the first aspect.

In a fifth aspect, a computer program product is provided, including an instruction which, when executed on a computer, causes a computer to perform the method in the above-mentioned first aspect or any possible implementation of the first aspect.

DESCRIPTION OF EMBODIMENTS

Technical solutions in the embodiments of the present application will be clearly and comprehensively described below with reference to the accompanying drawings in the embodiments of the present application.

It should be understood that the terms such as "system" and "network" herein are typically interchangeable. The term such as "and/or" herein is merely an association between associated objects, which indicates that there may be three relationships, for example, A and/or B may indicate presence of A only, of both A and B, and of B only. In addition, the character "/" herein generally indicates that contextual objects have an "or" relationship.

The technical solutions in the embodiments of the present application can be applied to various communication systems, such as a global system of mobile communication ("GSM" for short), a code division multiple access ("CDMA" for short) system, a wideband code division multiple access ("WCDMA" for short) system, a general packet radio service ("GPRS" for short), a long term evolution ("LTE" for short) system, an Frequency Division Duplex ("FDD" for short) system, an LTE time division duplex ("TDD" for short), a universal mobile telecommunication system ("UMTS" for short) or a worldwide interoperability for microwave access ("WiMAX" for short) communication system, or a future 5G system, etc.

Figure 1:
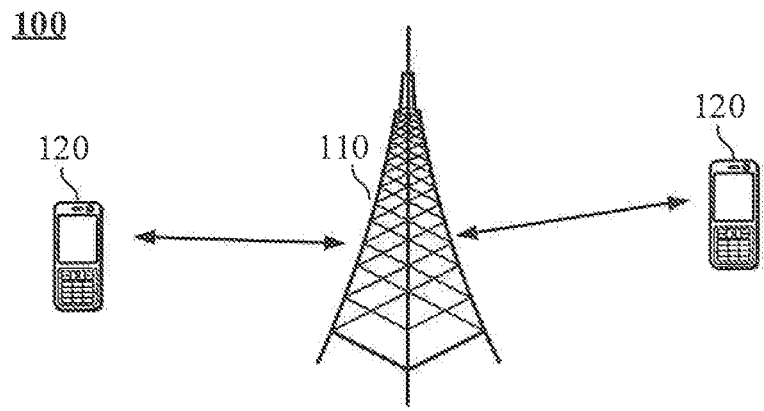
FIG. 1 is a schematic diagram of a communication system according to an embodiment of the present application.

FIG. 1 shows a wireless communication system 100 applied in the embodiments of the present application. The wireless communication system 100 may include a network device 110. The network device 100 may be a device that communicates with a terminal device. The network device 100 may provide a particular geographic area with a communication coverage and may communicate with a terminal device (e.g., UE) located within the coverage. In an embodiment, the network device 100 may be a base station (Base Transceiver Station, BTS) in the GSM system or the CDMA system, or a base station (NodeB, NB) in the WCDMA system, or an evolved base station (Evolutional Node B, eNB or eNodeB) in the LTE system, or a wireless controller in a cloud radio access network (CRAM), alternatively, the network device may be a relay station, an access point, a vehicle-mounted device, a wearable device, a network side device in a future 5G network or a network device in a future evolutional public land mobile network (PLMN).

The wireless communication system 100 also includes at least one terminal device 120 located within the coverage of the network device 110. The terminal device 120 may be movable or stationary. In an embodiment, the terminal device 120 may refer to an access terminal, User Equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, a vehicle-mounted device, a wearable device, a terminal device in the future 5G network, or a terminal device in the future evolutional PLMN.

In an embodiment, device to device (D2D) communications may be performed between terminal devices 120.

In an embodiment, the 5G system or network may also be referred to as a new radio (NR) system or network.

FIG. 1 exemplarily shows one network device and two terminal devices. In an embodiment, the wireless communication system 100 may include a plurality of network devices and other numbers of terminal devices may be included within the coverage of each of the network devices, this is not limited in the embodiment of the present application.

In an embodiment, the wireless communication system 100 may further include other network entities, such as a network controller, a mobility management entity and the like; this is not limited in the embodiment of the present application.

In the communication system of the embodiment of the present application, a terminal device may access a service through a 3GPP network (such as an LTE network, a future 5G network or the like) or a non-3GPP network (such as a Wireless Local Area Network (WLAN) or the like). A service access management node on the network device side may manage the service accessed through the 3GPP network or the non-3GPP network. For the service access management node, it is an urgent problem to be solved with regard to how to implement effective access of services.

Figure 2:
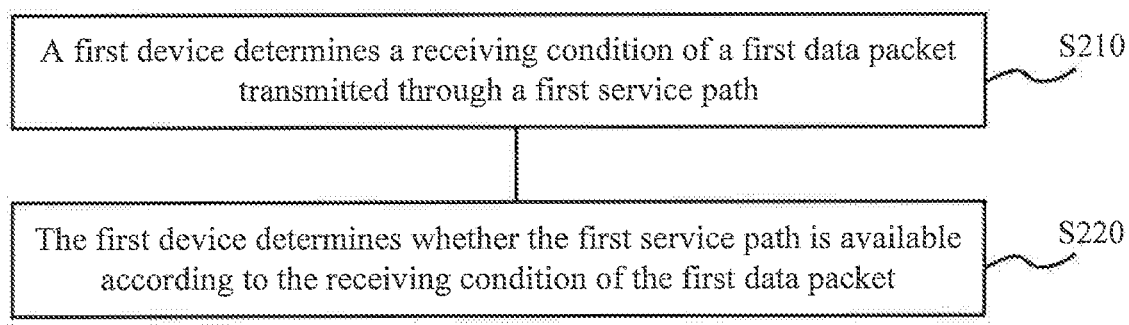
FIG. 2 is a schematic flowchart of a service access method according to an embodiment of the present application.

FIG. 2 exemplarily shows a service access method 200 according to an embodiment of the present application. The method 200 may be applied to the wireless communication system 100 described above, but the embodiments of the present application is not limited thereto.

As shown in FIG. 2, the method 200 includes the following:

S210, a first device determines a receiving condition of a first data packet transmitted through a first service path.

S220, the first device determines whether the first service path is available according to the receiving condition of the first data packet.

In the embodiments of the present application, the first device is a sending end of the first data packet, a second device is a receiving end of the first data packet, or the first device is the receiving end of the first data packet, and the second device is the sending end of the first data packet.

In the embodiments of the present application, the first device is a terminal device, and the second device is a network device; or the first device is a network device, and the second device is a terminal device.

Where the network device is a service function management node or a user plane function (UPF) entity.

Specifically, if the first device is the receiving end of the first data packet, the first device may determine, according to the receiving condition of the first data packet, which is transmitted through the first service path, by the first device, whether the first service path is available, or if the first device is the sending end of the first data packet, then the receiving end of the first data packet is denoted as a second device, which may report the receiving condition of the first data packet to the first device, and the first device may determine whether the first service path is available according to the receiving condition of the first data packet reported by the second device. Furthermore, in a case where the first service path is available, the first device accesses a to-be-accessed service using the first service path, or accesses the to-be-accessed service through a further service path in a case where the first service path is unavailable, or may release a part or all of the services on the first service path, or stop a part or all of the services on the first service path, that is, reduce a load of the first service path, and then access the to-be-accessed service through the first service path.

Therefore, in the service access method according to the embodiments of the present application, the first device may first determine whether the first service path for service access is available before performing service access, if yes, perform service access, if no, select a further service path to perform the service access, or access through the first service path with a reduced load, thereby realizing the effective access of services by a terminal, and further improving user experience.

In some possible embodiments, the first data packet includes a sequence number, where the first device determines a receiving condition of a first data packet transmitted through a first service path includes:

the first device determines the receiving condition of the first data packet according to the sequence number of the received first data packet.

The first data packet includes a sequence number, thus enabling the receiving end of the first data packet to determine whether the received data packet is correct according to the sequence number, and further determines the receiving condition of the first data packet.

As a specific embodiment, where the first device determines whether the first data packet is available according to the receiving condition of the first data packet includes:

the first device determines that the first service path is unavailable when at least one of following conditions is satisfied:

the first data packet is not correctly received within a specific time in a receiving period, a number of data packets correctly received in a receiving window is lower than a first preset value, and a ratio of the data packets received correctly to all received packets in the receiving window is lower than a second preset value, and a ratio of data packets received incorrectly to all received packets in the receiving window is higher than a third preset value, and a ratio of the data packets received incorrectly to the data packets received correctly in the receiving window is higher than a fourth preset value and a ratio of the data packet received correctly to the data packets received incorrectly in the receiving window is lower than a fifth preset value.

It should be noted that the receiving period herein may correspond to a sending period of the first data packet described below, that is, the sending end of the first data packet sends the first data packet to the receiving end of the first data packet in the sending period, and the receiving end of the first data packet receives the first data packet sent by the sending end of the first data packet in the receiving period.

It should be understood that the first preset value, the second preset value, the third preset value, the fourth preset value, and the fifth preset value may be set by a system, or determined according to a service need of a to-be-accessed service. For example, if the to-be-accessed service has a higher requirement on a link quality, then the first preset value may be set to a relatively large value, and the second preset value may be set to a relatively small value, and the third preset value may be set to a relatively small value, and the fourth preset value may be set to a relatively small value, and the fifth preset value may be set to a relatively large value, otherwise, if the to-be-accessed service has a lower requirement on the link quality, then the first preset value may be set to a relatively small value, and the second preset value may be set to a relatively large value, and the third preset value may be set to a relatively large value, and the fourth preset value may be set to a relatively large value, and the fifth preset value may be set to a relatively small value.

It should be noted that if the first device is the receiving end of the first data packet, the receiving condition of the first data packet may be determined by the first device, or if the first device is the sending end of the first data packet, the receiving condition of the first data packet may be reported to the first device by the sending end of the first data packet, that is, the second device. In summary, the first device may determine whether the first service path is available according to the receiving condition of the first data packet.

In some possible embodiments, in a case where the first device is a terminal device or a UPF entity, after the first device determines that the first service path is unavailable, the method 200 may further include:

the first device sends status information to a service function management node, where the status information is used to indicate that the first service path is unavailable, enabling the service function management node to switch a to-be-accessed service to a further service path other than the first service path, or initiate a request message for releasing the first service path.

That is, in a case where the first device is a terminal device or a UPF entity, if the first device determines that the first service path is unavailable, in this case, the first device may send the status information to the service function management node to notify the service function management node that the first service path is unavailable, in this way, when a terminal device initiates a to-be-accessed service, the service function management node switches the to-be-accessed service to a further service path, that is, accesses the to-be-accessed service of the terminal device through a further service path, or initiates a request message for releasing the first service path, that is, requests to release the first service path, so that the first device may access the to-be-accessed service initiated by the terminal device through the first service path.

Therefore, in the service access method according to the embodiments of the present application, in a case where the first service path is unavailable, the first device may notify the service function management node of information about the unavailability of the first service path, thus enabling the service function management node to switch a to-be-accessed service of the terminal device to a further service path, or release the first service path, and then access the to-be-accessed service initiated by the terminal device through the first service path, thereby realizing effective access of services, and further improving the user experience.

In an embodiment, the first device is a service function management node, and after the first device determines that the first service path is unavailable, the method further includes:

the first device switches a to-be-accessed service to a further service path other than the first service path, or initiates a request message for releasing the first service path.

Therefore, in the service access method according to the embodiments of the present application, in a case where the first service path is unavailable, the first device may switch a to-be-accessed service of the terminal device to a further service path, or release the first service path and then access the to-be-accessed service initiated by the terminal device through the first service path, thereby realizing effective access of services, and further improving the user experience.

In some possible embodiments, the method 200 further includes:

if determining that the first service path is available, the first device accesses a to-be-accessed service through the first service path.

That is, in the service access method according to the embodiments of the present application, in a case where the first service path is available, the first service path may be used to access a to-be-accessed service initiated by a terminal device, and in a case where the first service path is unavailable, a further service path may be used to access the to-be-accessed service initiated by the terminal device, or a part or all of the services on the first service path may be stopped, and the to-be-accessed service initiated by the terminal device may be accessed using the first service path.

In an embodiment, the first service path is a 3rd Generation Partnership Project (3GPP) path or a non-3GPP path.

If the first service path is a 3GPP path, the to-be-accessed service may be accessed through a 3GPP network (for example, an LTE network or a 5G network, etc.), or, if the first service path is a non-3GPP path, the to-be-accessed service may be accessed through a non-3GPP network, such as a WLAN network.

In some embodiments, the method 200 further includes:

the first device sends the first data packet to the second device according to a specific period, or receives the first data packet sent by the second device according to the specific period.

In an embodiment, the specific period is agreed by the first device and the second device, for example, the first device and the second device may determine, through message interaction, a sending period of the first device, that is, the above-mentioned specific period, or, if the first device is a terminal device, and the second device is a network device, then the specific period is configured by the second device, that is, the second device may configure, for the first device, the sending period of the first data packet, for example, the second device may send a first message to the first device, and configure, by using the first message, the sending period of the first data packet for the first device, the first message may be semi-static signaling (for example, a radio resource control (RRC) message) or dynamic signaling (for example, downlink control information (DCI).

Alternatively, the specific period may also be agreed through a protocol, in this way, the information interaction between the first device and the second device is not necessary, and the sending end may send the first data packet according to the sending period agreed through the protocol, and the receiving end may also receive the first data packet according to the sending period agreed through the protocol.

In a specific embodiment, where the first device sends the first data packet to the second device according to a specific period includes:

the first device sends the first data packet to the second device according to the specific period in a case where a first preset condition is satisfied.

That is, where the first device sends the first data packet according to the specific period may be performed in a case where the first preset condition is satisfied, for example, the first device may start to send the first data packet periodically in a case where a link quality of the first service path is poor.

In some possible embodiments, a data stream or bearer used for transmitting the first data packet has a corresponding relationship with a sending period of the first data packet.

For example, there may be a one-to-one correspondence or a many-to-one correspondence or the like between the data stream used for transmitting the first data packet and the sending period of the first data packet, similarly, there may also be a one-to-one correspondence or a many-to-one correspondence or the like between the bearer used for transmitting the first data packet and the sending period of the first data packet.

The method embodiments of the present application have been described in detail above with reference to FIG. 2, while device embodiments of the present application will be described in detail below with reference to FIG. 3 to FIG. 4. It should be understood that the device embodiments correspond to the method embodiments. For a similar description, reference may be made to the method embodiments.

Figure 3:
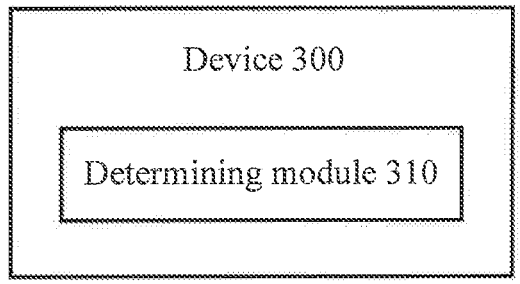
FIG. 3 is a schematic block diagram of a service access device according to an embodiment of the present application.

FIG. 3 shows a schematic block diagram of a service access device 300 according to an embodiment of the present application. As shown in FIG. 3, the device 300 includes:

a determining module 310, configured to determine a receiving situation of a first data packet transmitted through a first service path, and determine whether the first service path is available according to the receiving condition of the first data packet.

In some possible embodiments, the device 300 is a sending end of the first data packet, and the second device is a receiving end of the first data packet; or the device 300 is the receiving end of the data packet, and the second device is a sending end of the first data packet.

In some possible embodiments, the device 300 is a terminal device, and the second device is a network device; or the device 300 is a network device, and the second device is a terminal device.

In some possible embodiments, the network device is a service function management node or a user plane function (UPF) entity.

In some possible embodiments, the device 300 further includes:

a communicating module, configured to send the first data packet to the second device according to a specific period, or receive the first data packet sent by the second device according to the specific period.

In some possible embodiments, the communicating module is specifically configured to:

send the first data packet to the second device according to the specific period in a case where a first preset condition is satisfied.

In some possible embodiments, the specific period is agreed by the device and the second device; or, if the device is a terminal device, and the second device is a network device, then the specific period is configured by the second device.

In some possible embodiments, a data stream or bearer used for transmitting the first data packet has a corresponding relationship with a sending period of the first data packet.

In some possible embodiments, the device 300 is the sending end of the first data packet, and the device 300 further includes:

a communicating module, configured to receive the receiving condition of the first data packet reported by the second device;

the determining module 310 is specifically configured to:

determine whether the first service path is available according to the receiving condition of the first data packet reported by the second device.

In some possible embodiments, the determining module 310 is specifically configured to:

determine that the first service path is unavailable when at least one of following conditions is satisfied:

the first data packet is not correctly received within a specific time in a receiving period, a number of data packets correctly received in a receiving window is lower than a first preset value, and a ratio of the data packets received correctly to all received packets in the receiving window is lower than a second preset value, and a ratio of data packets received incorrectly to all received packets in the receiving window is higher than a third preset value, and a ratio of the data packets received incorrectly to the data packets received correctly in the receiving window is higher than a fourth preset value and a ratio of the data packet received correctly to the data packets received incorrectly in the receiving window is lower than a fifth preset value.

In some possible embodiments, the device 300 is a terminal device or a UPF entity, and the device 300 further includes:

a communicating module, configured to send status information to a service function management node, where the status information is used to indicate that the first service path is unavailable, enabling the service function management node to switch a to-be-accessed service to a further service path other than the first service path, or initiate a request message for releasing the first service path.

In some possible embodiments, the device 300 is a service function management node, and the device 300 further includes:

a communicating module, configured to switch a to-be-accessed service to a further service path other than the first service path, or initiate a request message for releasing the first service path.

In some possible embodiments, the device further includes:

an access module, configured to access a to-be-accessed service through the first service path if the device determines that the first service path is available.

In some possible embodiments, the first data packet includes a sequence number, and the determining module 310 is further configured to:

determine, according to the sequence number of the received first data packet, the reception condition of the first data packet.

In some possible embodiments, the first service path is a 3rd Generation Partnership Project (3GPP) path or a non-3GPP path.

It should be understood that the device 300 according to the embodiment of the present application may correspond to the first device in the method embodiment of the present application, moreover, the foregoing and other operations and/or functions of the units in the device 300 respectively aim to implement corresponding processes of the first device in the method 200 shown in FIG. 2. For the sake of brevity, details will not be described herein again.

Figure 4:
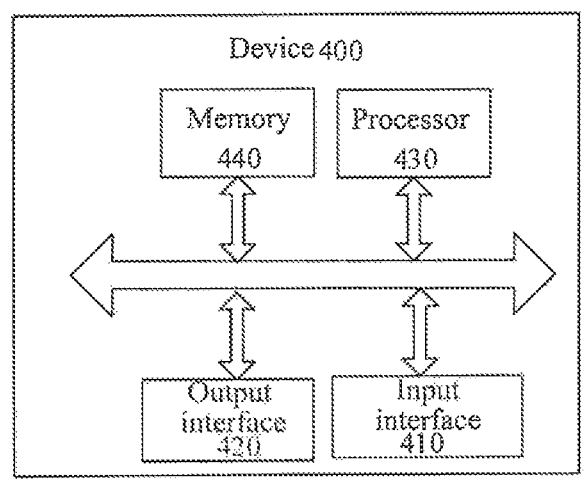
FIG. 4 is a schematic block diagram of a service access device according to another embodiment of the present application.

As shown in FIG. 4, an embodiment of the present application further provides a service access device 400. The device 400 may be the device 300 in FIG. 3, which can be configured to implement content pertaining to the first device corresponding to the method 200 in FIG. 2. The device 400 includes an input interface 410, an output interface 420, a processor 430, and a memory 440. The input interface 410, the output interface 420, the processor 430, and the memory 440 can be connected by a bus system. The memory 440 is configured to store programs, instructions or codes. The processor 430 is configured to execute the programs, the instructions or the codes in the memory 440 to control the input interface 410 to receive a signal and control the output interface 420 to transmit a signal and complete the operations in the foregoing method embodiments.

It should be understood that, in the embodiment of the present application, the processor 430 may be a central processing unit ("CPU" for short). The processor 430 may also be other general-purpose processor, digital signal processor (DSP), application specific integrated circuit (ASIC), field programmable gate array (FPGA) or other programmable logic device, discrete gate, or transistor logic device, discrete hardware component, or the like. The general-purpose processor may be a microprocessor or the processor may also be any conventional processor or the like.

The memory 440 may include a read only memory and a random access memory, and provides instructions and data to the processor 430. A portion of the memory 440 may also include a non-volatile random access memory. For example, the memory 440 may also be stored with device type information.

During an implementation, content of the foregoing method may be implemented by an integrated logic circuit of hardware or an instruction in a form of software in the processor 430. The content of the method disclosed in conjunction with the embodiments of the present application may be directly implemented by a hardware processor, or may be implemented by a combination of hardware and software modules in the processor. The software module may be located in a storage medium mature in the art, such as a random access memory, a flash memory, a read only memory, a programmable read only memory, an electrically erasable programmable memory, a register, or the like. The storage medium is located in the memory 440. The processor 430 reads information in the memory 440 and implements the content of the above method in conjunction with its hardware. To avoid redundancy, details will not be described herein again.

In a specific implementation, the communicating module and the accessing module in the device 300 shown in FIG. 3 may be implemented with the input interface 410 and the output interface 420 in FIG. 4, also, the determining module 310 in the device 300 shown in FIG. 3 may be implemented with the processor 430 in FIG. 4.

It may be known to persons of ordinary skill in the art that, the units and the algorithm steps of each example that are described with reference to the embodiments disclosed herein can be implemented by electronic hardware or a combination of electronic hardware and computer software. The situation whether these functions are performed by hardware or software depends on specific applications and design constraints of the technical solutions. Persons skilled in the art may implement the described functions by using different methods for each specific application, but such implementation should not be regarded as going beyond the scope of the present application.

It may be clearly understood by a person skilled in the art that, for the purpose of convenient and brief description, reference may be made to the corresponding processes in the foregoing method embodiments for detailed working processes of the foregoing systems, devices, and units, and details will not be described herein again.

In several embodiments provided in the present application, it should be understood that the disclosed systems, devices, and methods may be implemented in other manners. For example, the described device embodiments are merely exemplary. For instance, the division of the units is merely a division of logical functions and there may be other divisions during actual implementations. For instance, multiple units or components may be combined or integrated into another system, or some features may be omitted or not performed. In addition, the presented or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the scheme in the embodiments.

In addition, functional units in the embodiments of the present application may be integrated into one processing unit, or each of the units may exist alone physically, or two or more units are integrated into one unit.

If implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present application. The foregoing storage medium includes: any medium that can store program codes, such as a USB flash disk, a mobile hard disk, a Read-Only Memory (ROM), a Random Access Memory (RAM), a magnetic disk, or an optical disc, etc.

The above descriptions are merely specific embodiments of the present application; however, the protection scope of the present application is not limited thereto. Any modification or replacement that may be readily conceived by persons skilled in the art within the technical scope disclosed in the present application should fall into the protection scope of the present application. Therefore, the protection scope of the present application shall be subject to the claims.

What is claimed is:

1. A service access method, comprising:
    determining, by a first device, a receiving condition of a first data packet transmitted through a first service path; and
    determining, by the first device, whether the first service path is available according to the receiving condition of the first data packet;
    wherein the first device is a terminal device or a user plane function (UPF) entity, after the determining, by the first device, that the first service path is unavailable, the method further comprises: sending, by the first device, status information to a service function management node, wherein the status information is used to indicate that the first service path is unavailable, enabling the service function management node to switch a to-be-accessed service to a further service path other than the first service path; or
    wherein the first device is a service function management node, and after the determining, by the first device, that the first service path is unavailable, the method further comprises: switching, by the first device, a to-be-accessed service to a further service path other than the first service path.

2. The method according to claim 1, wherein the first device is a sending end of the first data packet, and a second device is a receiving end of the first data packet; or the first device is the receiving end of the first data packet, and the second device is the sending end of the first data packet.

3. The method according to claim 2, wherein the first device is a terminal device, and the second device is a network device; or the first device is a network device, and the second device is a terminal device.

4. The method according to claim 3, wherein the network device is a service function management node or a UPF entity.

5. The method according to claim 2, further comprising:
    sending, by the first device, the first data packet to the second device according to a specific period, or receiving the first data packet sent by the second device according to the specific period.

6. The method according to claim 5, wherein the sending, by the first device, the first data packet to the second device according to the specific period comprises:
    sending, by the first device, the first data packet to the second device according to the specific period in a case where a first preset condition is satisfied.

7. The method according to claim 5, wherein the specific period is agreed by the first device and the second device; or, if the first device is a terminal device, and the second device is a network device, then the specific period is configured by the second device.

8. The method according to claim 5, wherein a data stream or bearer used for transmitting the first data packet has a corresponding relationship with a sending period of the first data packet.

9. The method according to claim 2, wherein the first device is the sending end of the first data packet, and the determining, by the first device, the receiving condition of the first data packet transmitted through the first service path comprises:
    receiving, by the first device, the receiving condition of the first data packet reported by the second device;
    the determining, by the first device, whether the first service path is available according to the receiving condition of the first data packet comprises:
    determining, by the first device, whether the first service path is available according to the receiving condition of the first data packet reported by the second device.

10. The method according to claim 2, wherein the determining, by the first device, whether the first service path is available according to the receiving condition of the first data packet comprises:
- determining, by the first device, that the first service path is unavailable when at least one of following conditions is satisfied:
- the first data packet is not correctly received within a specific time in a receiving period, a number of data packets correctly received in a receiving window is lower than a first preset value, and a ratio of the data packets received correctly to all received packets in the receiving window is lower than a second preset value, and a ratio of data packets received incorrectly to all received packets in the receiving window is higher than a third preset value, and a ratio of the data packets received incorrectly to the data packets received correctly in the receiving window is higher than a fourth preset value and a ratio of the data packet received correctly to the data packets received incorrectly in the receiving window is lower than a fifth preset value.

11. A service access device, comprising: a memory and a processor, the memory being configured to store an instruction, and the processor being configured to execute the instruction stored in the memory for performing steps of:
- determining a receiving condition of a first data packet transmitted through a first service path, and determining whether the first service path is available according to the receiving condition of the first data packet;
- wherein the device is a terminal device or a user plane function (UPF) entity, and the processor is further configured to: control an output interface to send status information to a service function management node, wherein the status information is used to indicate that the first service path is unavailable, enabling the service function management node to switch a to-be-accessed service to a further service path other than the first service path; or
- wherein the device is a service function management node, and the processor is further configured to: control an output interface to switch a to-be-accessed service to a further service path other than the first service path.

12. The device according to claim 11, wherein the device is a sending end of the first data packet, and the second device is a receiving end of the first data packet, or the device is the receiving end of the first data packet, and the second device is the sending end of the first data packet.

13. The device according to claim 12, wherein the device is a terminal device, and a second device is a network device; or the device is a network device, and the second device is a terminal device.

14. The device according to claim 13, wherein the network device is a service function management node or a UPF entity.

15. The device according to claim 11, wherein the processor is further configured to:
- control an output interface to access a to-be-accessed service through the first service path if the device determines that the first service path is available.

16. The device according to claim 11, wherein the first data packet comprises a sequence number, and the processor is further configured to:
- determine, according to the sequence number of the received first data packet, the receiving condition of the first data packet.

17. The device according to claim 11, wherein the first service path is a 3rd Generation Partnership Project (3GPP) path or a non-3GPP path.

* * * * *